(12) United States Patent
Borrelli et al.

(10) Patent No.: US 6,524,773 B1
(45) Date of Patent: Feb. 25, 2003

(54) POLARIZING GLASSES HAVING INTEGRAL NON-POLARIZING REGIONS

(75) Inventors: Nicholas F. Borrelli, Elmira, NY (US); Chad B. Moore, Corning, NY (US); Paul A. Sachenik, Corning, NY (US)

(73) Assignee: Corning Incorporated, Corning, NY (US)

( * ) Notice: Subject to any disclaimer, the term of this patent is extended or adjusted under 35 U.S.C. 154(b) by 47 days.

(21) Appl. No.: 09/649,543

(22) Filed: Aug. 28, 2000

Related U.S. Application Data

(62) Division of application No. 09/142,962, filed as application No. PCT/US97/04870 on Mar. 25, 1997, now Pat. No. 6,171,762.
(60) Provisional application No. 60/014,619, filed on Mar. 28, 1996.

(51) Int. Cl.[7] .............................. G03F 7/40; C03C 15/00
(52) U.S. Cl. ...................... 430/322; 430/323; 430/330; 65/30.11; 65/31; 65/32.1
(58) Field of Search ................................. 430/322, 323, 430/330; 65/30.11, 31, 32.1

(56) References Cited

U.S. PATENT DOCUMENTS

| | | | |
|---|---|---|---|
| 3,737,341 A | 6/1973 | Croset et al. ............... 117/212 |
| 3,875,199 A | 4/1975 | Bloom .................... 260/347.2 |
| 3,902,881 A | * 9/1975 | Pirooz ............................ 65/30 |
| 4,042,449 A | 8/1977 | Hunt et al. ................. 156/651 |
| 4,125,405 A | 11/1978 | Araujo et al. ................. 106/54 |
| 4,155,734 A | 5/1979 | Krohn ............................ 65/30 |
| 4,155,735 A | 5/1979 | Ernsberger ..................... 65/30 |
| 4,259,406 A | 3/1981 | Borrelli ....................... 428/410 |
| 4,304,584 A | 12/1981 | Borrelli et al. ............. 65/30.11 |
| 4,908,054 A | 3/1990 | Jones et al. ................. 65/30.11 |
| 5,039,214 A | 8/1991 | Nagata et al. ............... 359/386 |
| 5,122,907 A | 6/1992 | Slocum ....................... 359/492 |
| 5,151,956 A | 9/1992 | Bloemer ....................... 385/11 |
| 5,235,449 A | 8/1993 | Imazeki et al. ............... 359/63 |
| 5,245,471 A | 9/1993 | Iwatsuka et al. ............ 359/494 |
| 5,305,143 A | 4/1994 | Taga et al. ................... 359/488 |
| 5,375,012 A | 12/1994 | Borrelli et al. ............. 359/485 |
| 5,425,046 A | 6/1995 | Davis, Jr. .................... 372/106 |
| 6,058,738 A | * 5/2000 | Gill et al. ................... 65/30.1 |
| 6,089,042 A | * 7/2000 | Gill et al. ................... 65/30.1 |
| 6,298,691 B1 | * 10/2001 | Borrelli et al. .............. 65/30.1 |

FOREIGN PATENT DOCUMENTS

| EP | 0 909 744 A2 | * 9/1998 |
| JP | 11-194218 | * 7/1999 |

* cited by examiner

*Primary Examiner*—Mark F. Huff
*Assistant Examiner*—Nicole Barreca
(74) *Attorney, Agent, or Firm*—Siwen Chen

(57) ABSTRACT

Polarizing glass having localized regions or patterns of non-polarizing glass is disclosed. The glass is formed by use of reducing gas-blocking material, by local thermal heating of the glass, or by an etching technique.

6 Claims, 2 Drawing Sheets

POLARIZING GLASSES HAVING INTEGRAL NON-POLARIZING REGIONS

CROSS-REFERENCED APPLICATIONS

The present application is a divisional application of U.S. Ser. No. 09/142,962 filed on May 21, 1999, which is now U.S. Pat. No. 6,171,762, granted Jan. 9, 2001, by Nicholas F. Borrelli, Chad B. Moore and Paul A. Sachenik, which, is a 317 of PCT/US97/04870 filed Mar. 25, 1997, which in turn, claims priority of the Provisional Application Serial No. 60/014,619 filed on Mar. 28, 1996.

BACKGROUND OF THE INVENTION

Hydrogen firing at elevated temperatures to change the color of glasses whose compositions contain reducible ions is well known. A notable commercial application of that technique is found in the Corning Incorporated eyewear product lines marketed under the SERENGETI® and CPF® trademarks. The color changes induced are attributed, to the reduction of a portion of the silver and lead ions respectively, in the glass to the atomic state.

Several methods have been suggested for making polaizing glasses. For example, one such method is to redraw a glass above its softening temperature. The glass contains a separate phase which is elongated by the redraw process. The thermal treatment which leads to the phase separation is usually carried out before the redraw process. In a particular version of the above process, the separated phase is initially spectrally non-absorbing material such as AgClBr, CuClBr, AgI, CuI or copper/cadmium halides, which must be subsequently modified to create a desired dichroic property necessary for the polarizing effect. This is accomplished by treating the stretched glass in hydrogen gas at elevated temperatures for sufficient time to effect the chemical reduction of the spectrally non-absorbing materials to their corresponding metal. The chemical reduction process is a combined process involving both the diffusion of hydrogen in the glass, and the chemical reaction of the hydrogen with the halide phase.

It is known that the chemical reaction proceeds very fast relative to the hydrogen diffusion which leads to the condition of a sharp boundary between the reduced region near the surface, and the unreduced region below the surface. The polarizing behaviors derives from the reduced layer. Also, when the polarizing glass is heated to the vicinity of 500° C. for any prolonged period of time, the elongated particles re-spheridize and the polarizing property is lost. That is, the elongated particle returns to its spherical shape. This is explained by the fact that once the glass is soft enough, the interfacial forces act to undo what the redrawing forces had accomplished.

For certain applications, it is desirable to have the polarizing properties restricted to localized regions of the glass. Accordingly, it is the object of the present invention to provide methods of partially or fully blocking the effect of hydrogen reduction over a portion of a glass surface, or other ways of altering the polarizing state.

SUMMARY OF THE INVENTION

Briefly, the invention relates to a polarizing glass having an integral non-polarizing region.

In one aspect, the invention relates to a method of producing a polarizing glass in which a region on the glass surface is rendered non-polarizing.

In a particular aspect, the invention relates to a method of forming a glass having integral polarizing and non-polarizing regions by:

(a) providing a glass having an elongated (stretched) reducible phase;
(b) protecting or masking a portion of the glass by selectively forming a layer of material on the surface of said portion of the glass;
(c) subjecting the unprotected regions of the glass to a reducing gas to reduce the reducible phase in said region; and
(d) removing the layer of material from the protected portion to reveal the underlying non-polarizing glass to thereby form a glass having integral polarizing and non-polarizing regions.

In still another aspect, the invention relates to a method of forming a non-polarizing region in a polarizing glass by, providing a polarizing glass comprising reducible elongated phase particles; and then subjecting a region of the glass surface to thermal heating to re-spheridize the elongated phase and thereby render the polarizing glass, non-polarizing in said region.

In yet another aspect, the invention relates to a method of forming a non-polarizing region in a polarizing glass by selectively removing the polarizing layer to render the glass in said region, non-polarizing.

As used herein:

"reducing atmosphere" refers to a gaseous atmosphere in which the chemical potential of oxygen is low. Examples of reducing gases include hydrogen, hydrazine vapor, cracked ammonia, deuterium and forming gas (i.e., a mixture of hydrogen and an inert gas, for example, $H_2/He$ and $H_2/N_2$).

DETAILED DESCRIPTION OF THE INVENTION

We have found, and disclose herein, that a polarizing glass having non-polarizing regions can be formed by (1) use of a hydrogen blocking film, (2) local thermal treatment, (3) etching, or (4) a combination of these methods. For ease of discussion, the layer of educing gas blocking material will be referred to herein as "hydrogen-blocking film" even though it is understood that in addition to hydrogen, other reducing gases such as cracked ammonia, deuterium or forming gas (i.e., a mixture of $H_2$ with He, $N_2$, or Ar) may be used.

As contemplated by the present methods, the polarizing glass contains a reducible elongated phase such as, $AgCl_xBr_{1-x}$, $CuCl_xBr_{1-x}$, where x has a value between 0 and 1, or phase separated Pb-borate glass. Other useful reducible phases include, AgI, CuI and Cu/Cd halides.

Figure 1A:
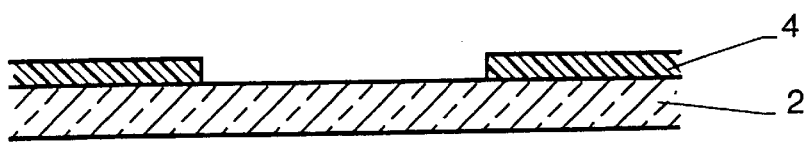
FIGS. 1a to 1c are schematic diagrams illustrating one inventive method of forming a polarizing glass having at least one non-polarizing region.
Figure 1B:
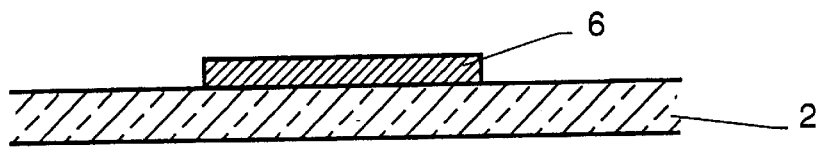
Figure 1C:
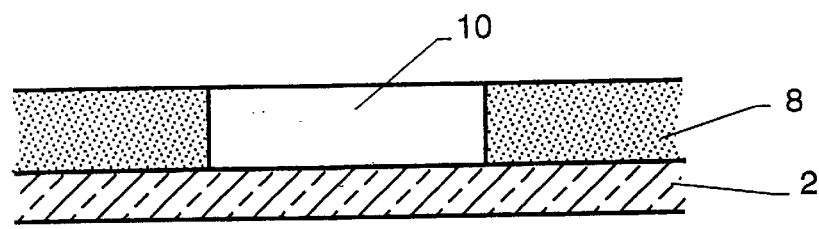
Figure 2A:
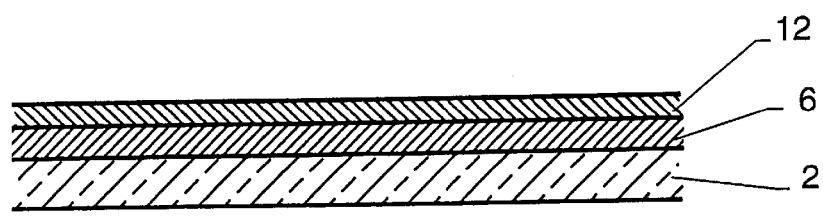
FIGS. 2a to 2d are schematic diagrams illustrating another inventive method of forming a pattern of polarizing and non-polarizing glass, by a photolithographic process.
Figure 2B:
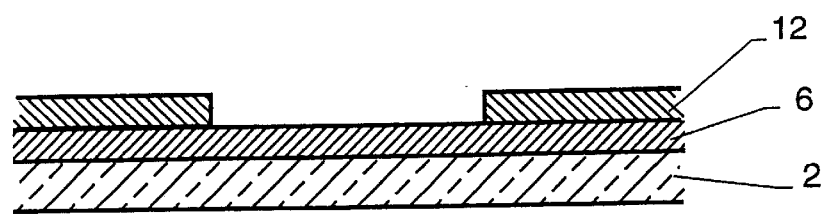
Figure 2C:
Figure 2D:
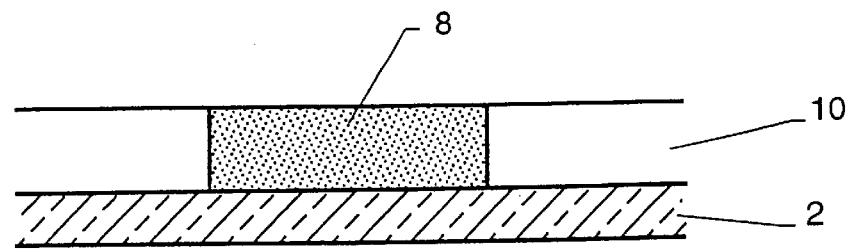

The invention will now be described with reference to the drawings. In the hydrogen blocking method (FIGS. 1a to 1c), a thin layer of material 6, preferably a dense film of material such as Cr, Mo or their oxides is formed on the surface of a non-polarizing glass 2 to retard the reduction process and enable the production of color gradients and designs or patterns on the glass. In a particularly useful embodiment using this technique, a non-polarizing region 10 is formed in a glass having a stretched or elongated particles by using a reducing gas and a patterned film which is capable of retarding penetration of the reducing gas. In this embodiment, the non-polarizing region is formed by:

1) providing a glass 2 having a layer of reducible elongated phase;
2) protecting a region of the glass by forming a layer of blocking material 6 on the surface of the region of the glass to be protected, the material being capable of blocking or preventing penetration of a reducing gas (FIG. 1b);
3) subjecting the unprotected region 8 of the glass to a reducing gas atmosphere to reduce the reducible phase in the unprotected region 8 and thereby render said region polarizing; and
4) removing the layer of blocking material 6 from the protected region to reveal the underlying non-polarizing glass (FIG. 1c).

The preferred reducing gas can be $H_2$, cracked ammonia, forming gas and $D_2$. If forming gas is used, then the hydrogen content of the forming gas mixture is preferably at least 0.1%, more preferably, at least 5%, and most preferably, at least 10%. The higher the hydrogen content of the forming gas mixture, the lower the pressure and the less the time required to reduce the reducible phase in the glass. The preferred forming gas is $H_2/N_2$.

The layer of hydrogen-blocking material may be patterned using any method. A particularly useful method of selectively forming the thin film layer is by placing a shadow mask 4 above the glass surface, such that the mask shadows or protects certain regions of the glass (FIG. 1). A patterned layer of blocking material is thereby formed on the unmasked or unprotected regions of the glass through holes or openings in the shadow mask.

Another useful method of patterning the thin film blocking layer is by using photolithography (FIG. 2). In this patterning process, (i) a thin film of hydrogen-blocking material 6 is deposited over the entire surface of a reducible glass 2, that is, a glass having a layer of stretched or elongated particles; (ii) a thin photoresist layer 12 is then applied to the surface of the hydrogen-blocking material 6 (FIG. 2a); (iii) the photoresist is lithographically patterned using a mask and developed (FIG. 2b); (iv) the patterned photoresist image is then transferred into the layer of blocking material by an etching process (dry or wet); and (5) the photoresist is removed leaving a patterned film blocking material (FIG. 2c). To form a region of non-polarizing glass, the assembly of FIG. 2c is exposed to a reducing gas atmosphere as above to render the glass polarizing in the unprotected region. Then the blocking material is removed to form a glass having polarizing 8 and non-polarizing 10 regions as shown in FIG. 2d.

We have found that the particular method used to deposit the thin layer of material is a key aspect of the invention. In particular, to avoid the formation of pinholes in the layer, the film is deposited, preferably in a Class 1000 (or better) clean room environment, by sputtering or other suitable methods.

The choice of the blocking material and its deposited thickness is made on the basis of how deep a reduced layer in the glass is required for any given application. In other words, the property of the deposited film, through the combined property of density and thickness, must be sufficient to retard the diffusion of $H_2$ for the time/pressure/temperature required to produce a sufficient reduced depth in the glass, in turn, providing the desired contrast For example, the depth to which the silver or copper halide phase is chemically reduced to silver, or copper (i.e., the thickness of the polarizable layer), determines the contrast of the polarizer. It has been shown that the reduced depth is proportional to the square root of the $H_2$ pressure and the time of treatment, as well as an exponential function of the temperature.

The contrast is defined as the ratio of the transmittance in the passing direction (perpendicular to the stretched direction, $T_0$) to the transmittance in the absorbing direction (parallel to the stretching direction). One can mathematically express this in terms of the thickness of the polarizing layer by the equation, contrast=$T_0/\exp(-\alpha d)$ where d is the polarizing film thickness. The coefficient, $\alpha$, depends on the wavelength of light and the degree to which the glass was stretched. For a given application, $\alpha$, and $T_0$ are determined experimentally, and the thickness of the polarizing film can be determined for any desired contrast. In one particularly useful embodiment, at a wavelength of 640 nm, a thickness of 28 $\mu$m is required to achieve a contrast of 100.

The particular choice of a material for use in the blocking of hydrogen, such as, Cr, Mo, Ta, Zn, W, may depend on the method used to form the thin layer and the related deposition variables. Other useful hydrogen blocking materials include the noble metals such as Au, Rh, Pd, Pt, and Ir. For example, where the layer is formed by film deposition method, the relevant variables may include the porosity of the deposited film, which depends on the specific deposition method and system, the film adherence, and how it varies with thickness, the thermal mismatch, and how it relates to thickness. These latter issues relate to the quality of the film that is produced, pinholes, cracks, and other features that would allow $H_2$ to penetrate through the film. A summary of illustrative results using several hydrogen blocking materials films is shown in Table 1. For this particular case the high contrast was desired at a wavelength of 640 nm.

In another embodiment, localized heating is used to render a portion of a polarizing glass, non-polarizing. In the local heating method, a non-polarizing region is formed in a polarizing glass by subjecting a region of the glass surface to thermal heating to re-spheridize the elongated phase and thereby render the polarizing glass, non-polarizing in the region of thermal contact. The object is to locally heat the glass to above about 450° C., preferably, above about 500° C. in a manner appropriate for forming the desired pattern. In the heated region, the elongated phase will be re-spheroidized and rendered nonpolarizing. An important point to realize is that one need only to heat the relatively thin surface polarizing layer to above 450° C., which means the amount of heat required can be quite small. This can be achieved by a number of ways. One way to easily localize the heated regions is to use a light source, such as laser, at a wavelength where the effective absorption depth, usually defined as the reciprocal of the absorption coefficient, is approximately equal to the polarizing film thickness. In this way the light is primarily absorbed in the layer to be heated. In this embodiment, care must be taken to avoid possible overheating, and the physical damage that may result from such overheating. The power input must be sufficiently controlled to maintain a safe temperature and avoid any possible damage.

An example of a light source that satisfies the above stated conditions is a $CO_2$ laser. The intensity distribution of the beam is important in that it will influence the temperature profile and, therefore, affect the nature of the transition from the non-polarizing to polarizing region. One can influence this by using a mask in a scanning mode, or a multimode laser with a flat intensity profile. In one embodiment, a $CO_2$ laser source is focused on a region of polarizing glass to heat the glass in said region and thereby render the glass non-polarizing by re-spheroidizing the elongated phases as described above.

Another way to provide local heating is to use a polarized light source whose polarization direction is oriented in the absorbing orientation of the polarizing material. The wavelength of the light is chosen to correspond to the high contrast spectral region.

Another way to provide local heating in the thin polarizing layer is to use a high current of an energetic beam, such a electrons or ions, either focused or in conjunction with a suitable mask. The beam would locally heat the polarized surface layer.

Another useful method of forming a non-polarizing region by local thermal treatment, is by thermal contact. In one such embodiment, heated tips or ridges are brought in contact with the polarized layer of the glass to heat the contact region, and thereby effect re-spheroidization.

In using the thermal contact method, care must be taken to avoid thermal shock which may result due to the rapid heating and cooling. One possible disadvantage of the thermal heating methods is the residual birefringence that may result from the rapid heating and cooling. This can be mitigated by careful annealing. In this embodiment, it is not necessary to directly contact the polarizing glass with the heat source, as effective heating can be achieved without direct contact. Thus, it may be sufficient to bring the heat source to the proximate region of the glass to be heated, since it is the heat radiation, rather than the heat source itself that is required to achieve the objective of this method.

Figure 3A:
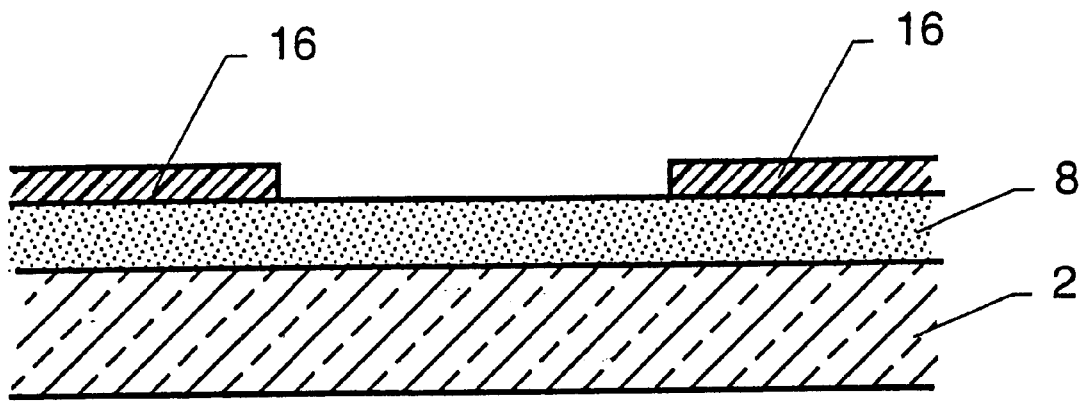
FIGS. 3a and 3b are schematic diagrams illustrating an embodiment of the invention, involving, exposing an assembly of polarizing glass and photoresist to light radiation, developing the photoresist to expose the underlying polarizing layer (FIG. 3a), etching the exposed region to remove the polarizing layer in said region, and the stripping away the photoresist (FIG. 3b).
Figure 3B:
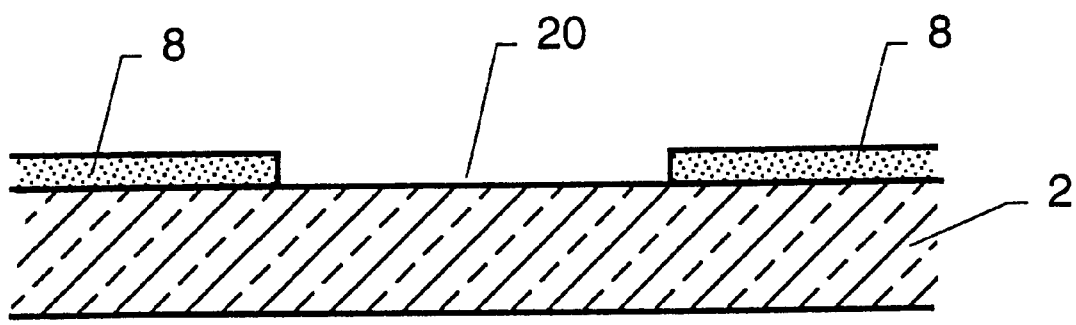

The etching method (FIGS. 3a and 3b), relies on the selective removal of the polarizing layer by any number of etching techniques. In this method, parts of the polarizing layer 8, is protected by use of a film or layer of metal or photoresist 16. The unprotected layer of polarizing glass is then etched to remove the polarizing layer and thereby form a polarizing glass having an integral non-polarizing region 20 (FIG. 3b). The protected region restricts the removal of the polarized surface layer. Preferably, the thickness of the polarizing layer is in the range of 10–50 microns, depending on the polarizing property required. The selective removal or etching away of the polarizing layer may be done by either wet or dry etching techniques. This method may produce a phase front alteration to a beam because light passing through it may have different optical paths in the etched and non-etched areas. This front alteration may be undesirable for certain applications.

EXAMPLES

1. Hydrogen Blocking
    a) A Mo film of the order of 1 $\mu$m thick was deposited through a patterned shadow mask onto a stretched glass surface. The mask was maintained in intimate contact with the sample. The metal patterned sample was then treated in pure $H_2$ atmosphere at 420° C., 1 atm, for 17 hours. A polarizing layer having a depth of about 30 $\mu$m was formed in the unmasked region, while the masked region remained non-polarizing. The Mo film was then removed by a suitable acid. If a single sided patterned polarizing effect is desired, the entire back side can be covered with Mo to protect it. If desired, a two-sided product may be produced by apply the same or a different pattern on the opposite side of the glass. In this example, the hydrogen-blocking material was applied by sputtering, in a Class 1000 clean room environment.
    b) Same as above except that the hydrogen-blocking material was Cr, having a thickness of about 0.6 $\mu$m. The $H_2$ treatment was at 420 ° C., at 1 atm, for 3 hours. The resulting polarizing layer had a depth of about 15 $\mu$m.
    c) Same as above except that the hydrogen-blocking layer was 1 $\mu$m of ZnO. The $H_2$ treatment was 420° C. for 3 hours, at 1 atm. Thickness of the polarizing layer was 15 $\mu$m In a similar experiment, we found that Mo film having a thickness as low as 0.5 $\mu$m can be treated in a hydrogen environment at 1 atm, 420° C. for 16 hours without any bleed through. That is, the hydrogen did not penetrate through the Mo film into the underlying glass. We have found that the higher the pressure, the more likely the hydrogen is to bleed through the film. Also, the denser the film the less likely the hydrogen is to bleed through the film. For a given hydrogen-blocking material, the optimal reducing gas treatment conditions (time, temperature, pressure) necessary to minimize or reduce bleed through can be determined by experimentation. For example, if a forming gas mixture having low hydrogen content is used, then the reducing gas treatment can be carried out at high pressure with minimal effect from any resulting bleed through.

2. Local Heating
    a) A glass sample having a reducible elongated phase was exposed to a hydrogen environment as described above to form a polarized glass. A 4W cw $CO_2$ laser was focused to a 1.5 mm spot on the polarized glass sample for a fraction of a second using a shutter. The exposed spot was yellow in color, and non-polarizing corresponding to the condition of the respheroidization of the elongated silver particles.
    b) The same as above, but the sample was exposed to the $CO_2$ laser before the $H_2$ treatment. This heat treatment respheroidized the metal halide particle in the region exposed to the laser. The sample was then treated in a $H_2$ atmosphere as described above to develop the polarizing layer. Because the heated area only contained spherical particles, no polarizing property was developed in the exposed area.

3. Etching
    a) A glass sample having a stretched or elongated layer was coated with 0.2 $\mu$m of Cr and then coated with photoresist. The sample was exposed to light through a mask containing the desired pattern as shown in FIG. 2. The resist was then developed to expose the underlying Cr layer in the unmasked region, and the Cr layer was etched away. The remaining photoresist material was then stripped leaving a pattern of metal-covered and uncovered regions, (FIG. 3a). Using a wet chemical etching technique, the sample was then dipped in dilute HF for a sufficient time to dissolve the glass in the uncoated region to a thickness corresponding to the polarizing layer. The Cr layer was then stripped to obtain a polarizing glass, having an integral non-polarizing region, (FIG. 3b).
    b) The same as above, except that a dry etching process (reactive ion etching) was used to remove the polarizing glass layer at a rate of about 3 $\mu$m per hour.

The Preferred Embodiment

In the preferred embodiment, the metal films used to inhibit the $H_2$ penetration were delineated using a shadow mask. Samples were prepared using two dense metal—Cr and Mo. Thin layers of the hydrogen-blocking metal were deposited using either a CVC DC sputtering system or a MRC in-line sputter system, both in a Class 1000 clean room. If desired, a film of the reducing gas blocking material may also be applied to the other surface to the polarizing glass prior to the hydrogen treatment. The deposition conditions were as

|  | Cr | Mo |
| --- | --- | --- |
| Pressure (mT) | 1 | 10 |
| Power (W) | 1000 | 1000 |
| Deposition Rate (A/s) | 3.5 | 15 |
| Rotation number | 5.0 |  |
| Belt speed (in/min) |  | 10 |
| Passes |  | 6 |

The glass used in all cases was Polarcor™ (available from Corning Incorporated), with a 680 nm center peak wavelength. The samples were ground and polished to a thickness of 0.5 mm before hydrogen treatment. The results are summarized in the table below.

TABLE 1

| $H_2$-block. Mat'l | Thickness of $H_2$ block. material ($\mu$m) | $H_2$ treatment Temp/time/pressure (° C./hours/atm) | Polarizing film Thickness ($\mu$m) |
| --- | --- | --- | --- |
| Cr | 0.4–0.6 | 415/3/1 | 15 |
| Mo | 1.0 | 415/16/1 | 30 |
| Mo | 1.0 | 415/7/1 | 20 |
| Mo | 1.0 | 415/17/1 | 30 |
| Mo | 1.0 | 415/3/1 | 8 |

TABLE 1-continued

| $H_2$-block. Mat'l | Thickness of $H_2$ block. material ($\mu$m) | $H_2$ treatment Temp/time/pressure (° C./hours/atm) | Polarizing film Thickness ($\mu$m) |
| --- | --- | --- | --- |
| ZnO | 1.0 | 415/4/1 | 15 |
| Mo | 1.0 | 350/1.25/5 | 30 |

What is claimed is:

1. A method of forming a non-polarizing region in a polarizing glass comprising the steps of:

a) providing a glass having a polarizing layer, said polarizing layer comprising elongated particles; and, b) selectively subjecting a region of said polarizing layer to a thermal heating treatment to respheroidize said elongated particles in said region and thereby render said glass in said region non-polarizing.

2. The method of claim 1, wherein said elongated particles are selected from the group consisting of $AgCl_xBr_{1-x}$, $CuCl_xBr_{1-x}$, where x has a value between 0 and 1, Pb-borate, AgI, CuI and Cu/Cd halides.

3. The method of claim 1, wherein said thermal heating is conducted at a temperature of at least 450° C.

4. The method of claim 3, wherein said thermal heating is conducted at a temperature of at least 500° C.

5. The method of claim 1, wherein said thermal heating is achieved by contacting said region with a heating source selected from the group consisting of a laser, electron beam, and ion beam.

6. A glass having a pattern of polarizing and non-polarizing regions formed according to the process of claim 1.

* * * * *